United States Patent [19]
Li et al.

[11] Patent Number: 5,875,287
[45] Date of Patent: Feb. 23, 1999

[54] BANDING NOISE REDUCTION FOR CLUSTERED-DOT DITHER

[75] Inventors: Chia-Hsin Li; Joseph Shu, both of San Jose, Calif.

[73] Assignee: Seiko Epson Corporation, Tokyo, Japan

[21] Appl. No.: 607,071

[22] Filed: Feb. 26, 1996

[51] Int. Cl.[6] .............................. B41B 15/00; G06K 9/00; H04N 1/40; H04N 1/46

[52] U.S. Cl. .......................... 395/102; 395/102; 395/109; 382/162; 382/167; 358/457; 358/535

[58] Field of Search ..................................... 395/102, 109; 382/162, 167, 237, 270; 358/535, 457, 456, 458, 460, 466, 298; 347/15, 43

[56] References Cited

U.S. PATENT DOCUMENTS 5,764,862  12/1995  Metcalfe et al. ........................ 395/102
5,768,411   2/1996  Shu et al. .............................. 382/162

Primary Examiner—Edward L. Coles
Assistant Examiner—Twyler M. Lamb

[57] ABSTRACT

The binary, on-or-off commands for a binary scan-line-oriented display are obtained by half-toning through the use of a dither matrix of the clustered-dot variety. But in "tiling" the display surface with the replicated dither matrix, successive columns of the dither matrices are offset from each other, in the direction transverse to the scan direction, by a fraction of the cluster-row spacing. This reduces the banding artifacts that otherwise result from non-uniform scan-line spacing.

14 Claims, 4 Drawing Sheets

|     |     |     |     | 52  |     |     |     |     |
|-----|-----|-----|-----|-----|-----|-----|-----|-----|
| 207 | 215 | 191 | 143 |     | 49  | 41  | 65  | 113 |
| 223 | 255 | 247 | 183 |     | 33  | 1   | 9   | 73  |
| 199 | 239 | 231 | 167 |     | 57  | 17  | 25  | 89  |
| 135 | 175 | 159 | 151 |     | 121 | 81  | 97  | 105 |
|     |     |     |     |     |     |     |     | 54  |
| 53  | 45  | 69  | 117 |     | 201 | 209 | 185 | 137 |
| 37  | 1   | 13  | 77  |     | 217 | 255 | 241 | 177 |
| 61  | 21  | 29  | 93  |     | 193 | 233 | 225 | 161 |
| 125 | 85  | 101 | 109 |     | 129 | 169 | 153 | 145 |

BANDING NOISE REDUCTION FOR CLUSTERED-DOT DITHER

RELATED APPLICATIONS

Applicants hereby incorporate by reference the following U.S. Patent applications contemporaneously filed and commonly assigned herewith:

U.S. patent application Ser. No. 08/607,074 Joseph Shu and Chia-Hsin Li for GENERATING COLOR-CORRECTION LOOK-UP-TABLE ADDRESSES BY MULTI-LEVEL HALF-TONING.

U.S. patent application Ser. No. 08/607,073 of Joseph Shu and Chia-Hsin Li for CLUSTERED-DOT DITHER WITH WHITE-FLECK SUPPRESSION.

U.S. patent application Ser. No. 08/607,075 of Joseph Shu and Chia-Hsin Li for DISPERSED-DOT DITHER WITH IMPROVED LIGHT-COLOR SMOOTHNESS.

FIELD OF THE INVENTION

The present invention is directed to scan-type display devices and in particular to eliminating artifacts of scanning-process imperfections.

BACKGROUND OF THE INVENTION

Many display devices, such as laser printers and ink-jet printers, form their displays in a raster-scan manner: the ink dispenser or laser beam scans from left to right and/or right to left in successive rows on the display medium. In this way, it renders an image that at some point has been represented in a raster-scan format as discrete picture-element ("pixel") values. This representation, as well as processing employed to command the display device to render it, are based on the assumption of a regular pixel spacing: the row-to-row spacing is assumed to be uniform. But it is difficult to cause reality to match this ideal so closely that imperfections are not detectable, so one must either exercise great care and suffer the attendant expense in order to achieve the required uniformity or tolerate the artifacts that result from failure to do so.

One of the undesirable visual artifacts of this lack of uniformity is a type of banding that is sometimes seen in regions where the display device is attempting to render a uniform gray or other color level. Instead of the uniform color, the non-uniform scan-line spacing ends up causing bands of lighter and darker regions. This typically results from interaction of the non-uniform line spacing with the half-toning process that the printer or similar display device uses to render shades of gray. At any given pixel, devices such as ink-jet and laser printers are typically capable only of on-and off operation: they either deposit a dot of the imaging agent in the pixel or not. In a monochrome printer, for instance, a given pixel is only black or white; there is no shade of gray.

In order to render gray-scale values, printers rely instead on duty cycle. In regions that are intended to be darker, more pixels receive dots. In lighter regions, fewer do. One way of achieving this result is to have groups of dots form clusters, which are larger or smaller in accordance with the intended gray level to be rendered. The effect is quite similar to that of the traditional photoengraving half-tone screen. Non-uniform spacing can make clusters formed by different row sequences differ in size and thereby cause unintended variations in displayed color. These variations tend to form undesirable visible bands.

One can avoid this effect by employing different half-toning techniques, such as distributed-dot dithering, in which the "turned-on" pixels are not clustered together. Because clusters generally do not form, non-uniform scan-line spacing does not change cluster size, so the non-uniform line spacing is less evident. But this method relies to a certain extent on the display device's ability to display isolated pixels, and certain types of display devices are limited in this respect.

SUMMARY OF THE INVENTION

We have found that the banding effect can be largely eliminated even with clustered-dot dithering if successive columns of "dither matrix" replications used in the half-toning process are offset from each other in the direction transverse to the scan direction by a fraction of the cluster-row spacing.

In digital systems, the half-toning process is typically performed by conceptually overlaying the display surface with respective "dither matrix" elements. The matrix elements are thresholds that are not in general the same for neighboring pixels, and a pixel receives a dot only if the value requested for it exceeds the corresponding dither-matrix-element value. In general, a higher requested value results in more pixels' being turned on, while lower values result in fewer.

A dither matrix designed for clustered-dot dithering is distinguished by the fact that high threshold values tend to occur in clusters, as do low threshold values, and it is this pattern that causes turned-on pixels to form clusters that are larger or smaller in accordance with the intended gray-scale value. The dither matrix employed ordinarily is much too small to cover the entire display surface. Instead, it is replicated to "tile" the display surface. The pattern in the matrix is such that in conventional tiling the clusters occur in scan-direction-extending rows.

In accordance with the present invention, columns of the matrix replications are so offset that clusters occurring successively in the scan direction are offset from each other, in the direction transverse to the scan direction, by a fraction of the period with which the cluster rows occur. We have found that such a pattern tends to suppress the banding effect that afflicts conventional half-toning approaches.

BRIEF DESCRIPTION OF THE DRAWINGS

The invention discussion below refers to the accompanying drawings, of which.

DETAILED DESCRIPTION OF AN ILLUSTRATIVE EMBODIMENT

As the invention description proceeds, it will become apparent that the invention can be embodied in dedicated circuitry designed particularly to implement the invention's teachings. Such an arrangement can be included in a printer that receives instructions in terms of high-resolution nominal colors or gray scales, and the dedicated circuitry can be designed to convert the requested values to the on-and-off or other low-value-resolution instructions required to render the requested image. But the invention will more typically be implemented by a general-purpose machine, such as a personal computer operating as a printer driver, among whose functions is to convert an image expressed in nominal color values into display-device commands that specify the low-level, typically on-or-off operation of a printer that the computer controls.

Figure 1:
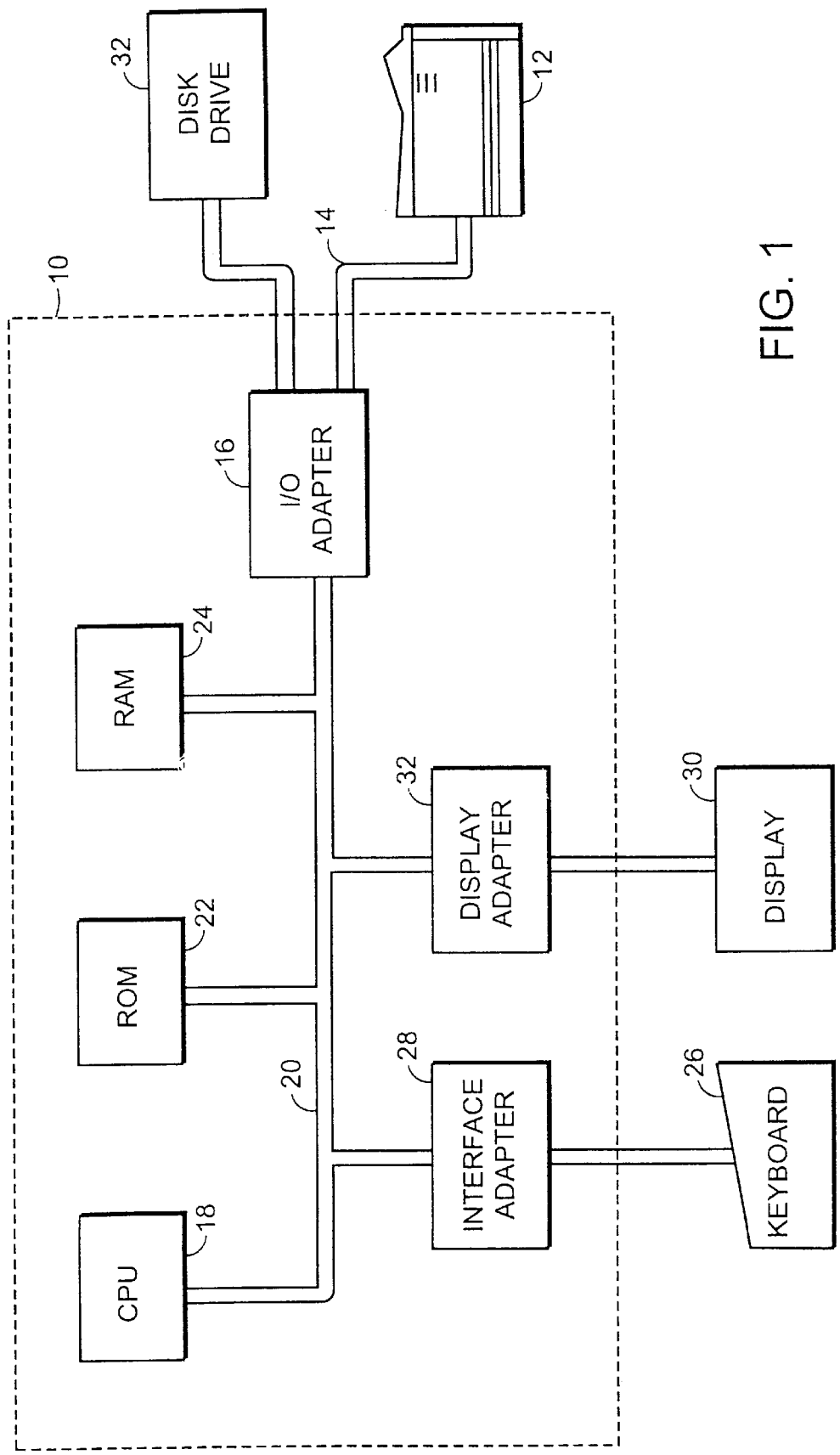
FIG. 1 is a hardware-perspective block diagram that depicts the typical environment in which the present invention is practiced.

FIG. 1 depicts a typical hardware environment. A personal computer 10 sends a display device such as an ink-jet printer 12 low-level instructions, i.e., instructions that specify which individual display-medium pixels should receive ink dots. The drawing depicts the printer 12 as receiving these instructions by way of an appropriate channel 14. Computers that are capable of practicing the present invention come in a wide variety of configurations, and FIG. 1 depicts one in which channel 14 is provided by an input-output adapter 16 with which a central processing unit 18 communicates by way of an internal bus 20.

Of course, the central processing unit 18 will typically fetch data and instructions at various times from a variety of sources, such as solid-state read-only and read-write memories 22 and 24. FIG. 1 also depicts the computer 10 as communicating, as is typical, with a keyboard 26 by way of an interface adapter 28.

The present invention particularly concerns display devices within this environment. In this connection FIG. 1 depicts the central processing unit 18 as being coupled to a cathode-ray-tube display 30 by a display adapter 32. The computer 10 can employ the present invention's teachings not only to drive printer 12 but also to form an image on the cathode-ray-tube display 30; the broader aspects of the invention are applicable to any pixel-organized display device. But its use on display devices of the cathode-ray-tube type will be infrequent, because present-day cathode-ray-tube computer monitors such as display 30 are capable of value resolution greater than the simple on-or-off choice to which most printers are limited. Although dithering can be practiced in a conversion from a high value resolution to any lower value resolution, not merely to binary representations only, the value resolution of which most monitors are currently capable is usually considered adequate, and dithering is not ordinarily considered necessary. Nonetheless, the present invention's teachings are not limited to ink-jet or other printers, but instead are applicable to digital pixel-oriented display devices generally.

In the typical situation, the computer 10 implements the present invention's teachings when it is acting as a printer driver. The instructions that configure the computer to perform this function are usually included in the operating-system software transferred to the computer's disc drive 32 and stored in a disc that the drive contains. Often, the driver software will have been loaded into the computer system from a diskette or CD-ROM. In any event, the computer 10 reads the printer-driver instructions from the disc drive in most cases and then performs the below-described functions to implement the present invention's teachings.

Figure 2:
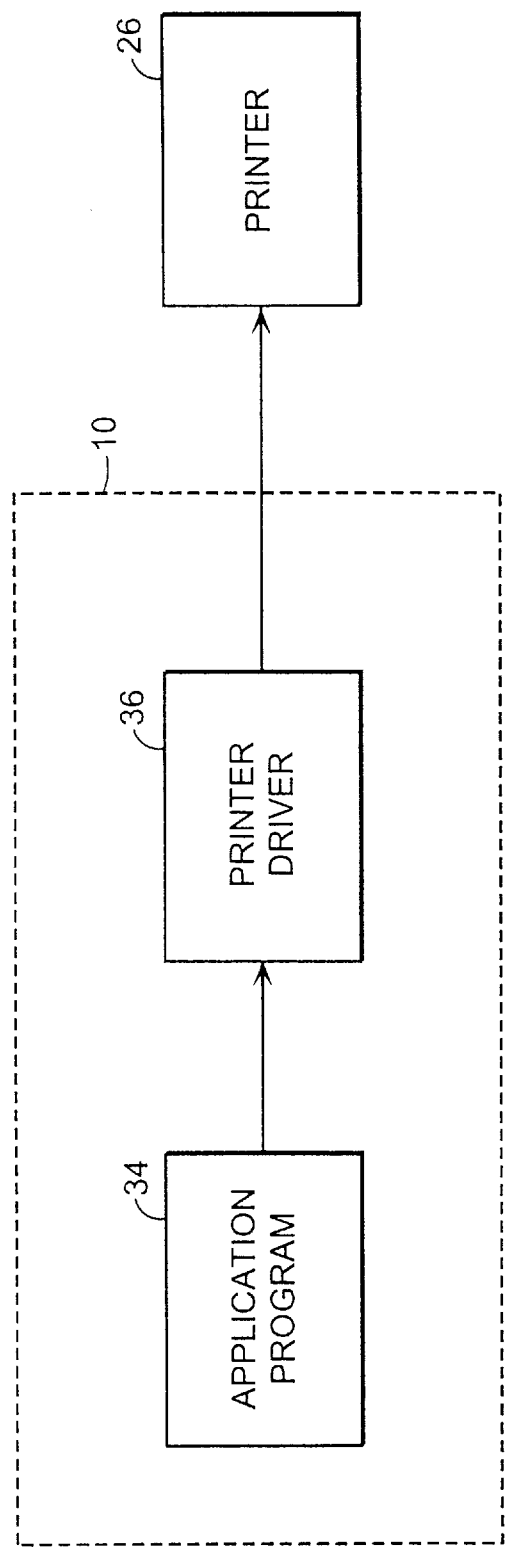
FIG. 2 is a block diagram that depicts that environment from a software point of view.

FIG. 2 depicts the typical situation from more of a software standpoint. Typically, the present invention's teachings will come into play when the computer 10 is operating a user's application program 34 and that program makes a system call requesting that an image be printed. The requested operation is carried out by a printer driver, which is usually considered to be part of the operating system but is specific to the designated printer. The printer driver's purpose is to convert a device-independent representation of the image into low-level printer instructions that will render that image as faithfully as the printer's limitations permit.

Figures 3, 4:
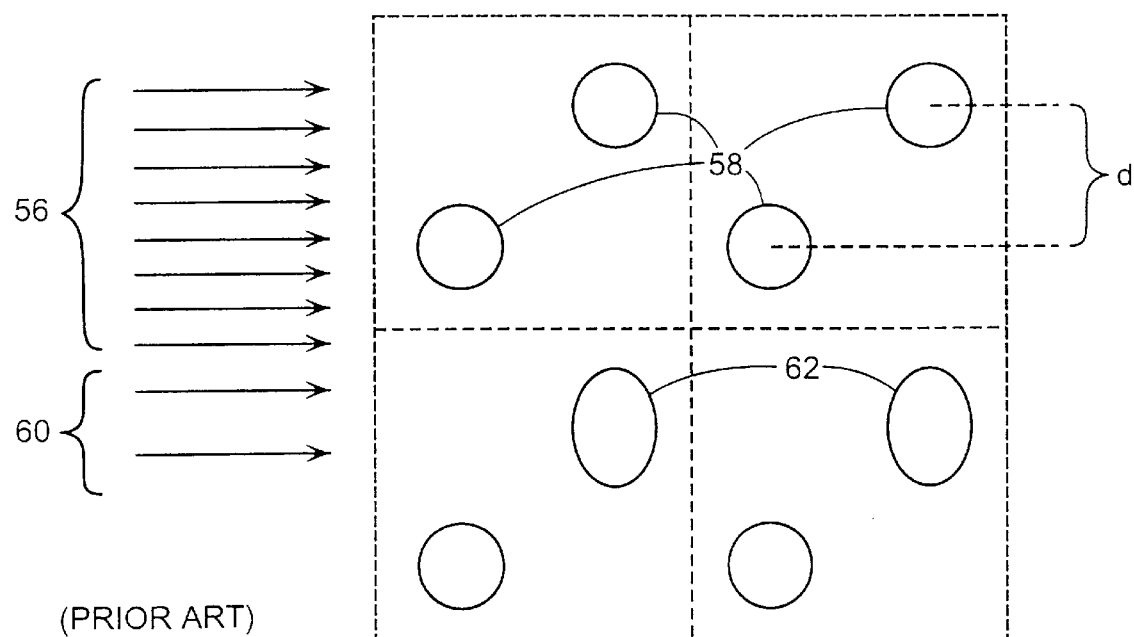
FIG. 3 shows a typical clustered-dot-dither matrix.
FIG. 4 depicts the patterns that clustered-dot-dithering produces.

FIG. 3 depicts a dither matrix of the type that one can employ for clustered-dot dithering. Each matrix element is associated with a respective display pixel in accordance with the matrix element's position. For the sake of concreteness, let us assume that the pixel values' gray-scale range is 0–255 and that the gray scale requested for the region to which the FIG. 3 matrix is applied is 128, i.e., right in the middle of the range. Under these circumstances, the pixel associated with the upper-left matrix element, i.e., with the dither threshold value of 207, would not receive a dot, since the requested value, 128, is not greater than the threshold value. Nor would the pixel immediately to the right, to which the dither matrix applies a value of 215, since that threshold, too, is greater than the requested value.

On the other hand, the pixel associated with the upper-right matrix element, whose value is 113, would receive a dot, as would the pixel immediately to its left, with which the matrix associates a value of 65. These are examples of the fact that the illustrated matrix tends to cause printed and non-printed pixels to be clustered. Indeed, if we divide the matrix into quadrants by lines 52 and 54, inspection reveals that, for a gray-scale value of 128, all pixels associated with matrix elements in the upper right and lower left quadrants receive dots, while none of those associated with matrix elements in the upper left and lower right quadrants do.

In conventional practice, a matrix such as this is replicated to "tile" the entire display, so the clusters of printed dots will be repeated throughout the region in which the gray-scale value of 128 is requested.

Further inspection of the matrix reveals that the lowest values in the upper right and lower left quadrants are near the respective centers of those quadrants, and values increase more or less in an outward spiral, while the highest values of the upper left and lower right quadrants are in the centers, and values decrease in an outward spiral. As a result, the cluster of printed pixels increases in size as requested gray-scale value increases, while the unprinted-pixel cluster shrinks. The individual clusters typically are small enough in size that the observer ordinarily does not perceive them individually, but as a group the larger clusters produce the effect of a darker gray, while a smaller printed-pixel clusters give the effect of a lighter gray.

We refer to FIG. 4 to illustrate the effect that non-uniform display-device line spacing causes. For the sake of discussion, we will assume that the requested level is relatively light, having a value of, say, only a quarter of the range. As the display surface is scanned in uniformly spaced scan lines 56, it produces printed clusters 58 and non-printed clusters between them. The printed clusters are relatively small and produce a light-colored overall visual effect.

Now consider the effect of non-uniformly spaced scan lines. If a pair of scan lines such as lines 60 has a greater-than-nominal spacing, the resultant printed clusters 62 are larger than their fellows, even though there has been no change in the requested gray level. As a consequence, the visual effect is that of a band of darker gray where none is intended.

Figure 5:
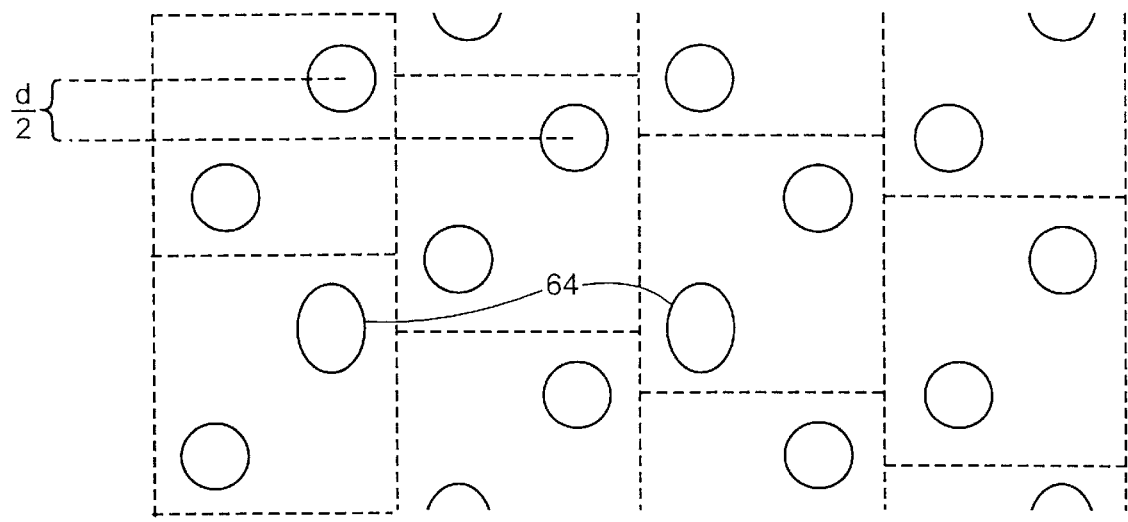
FIG. 5 depicts the cluster pattern that results from employing the present invention's teachings.

To understand the way in which we suppress this effect, first consider the cluster-row spacing d in FIG. 4. We have found that we can suppress the banding effect if we offset successive clusters in the dither matrices by a fraction of that cluster-row spacing, as FIG. 5 illustrates. In FIG. 5, each successive column of matrix "tiles" is offset in the direction transverse to the scan direction by one-half the cluster-row spacing. (A column will be understood to extend in the direction transverse to the scan direction.) The fraction one-half is not required for application of this method, but it is a fraction that we have employed successfully. Although non-uniform scan spacing still distorts individual clusters, as clusters 64 suggest, the banding suppression that we have discovered appears to result from the fact that staggering the matrices tends to break up the bands of distorted clusters so that the eye is not nearly as sensitive to the distorted clusters' occurrence.

In general, this can be implemented by using a single stored dither matrix but addressing it with a row offset that depends not only on scan line, as is conventional, but also on position within the line, which conventionally is used only to generate an offset for the position within the row. Specifically, if a dither matrix D of M rows and N columns is employed and n is the number of scan lines of offset—and is equal to a fraction of the cluster-row spacing—the dither threshold fetched for a given—location pixel can be determined by treating the display as overlaid by a super matrix D', in which:

$$D'_{ij}=D_{k,n},$$

where $$k=i \bmod M$$

and $$n=[j+(i/N)r]\bmod N$$

or $$n=[j-(i/N)r]\bmod N.$$

Here r is the number of pixel rows of matrix column offset.

Figure 6:
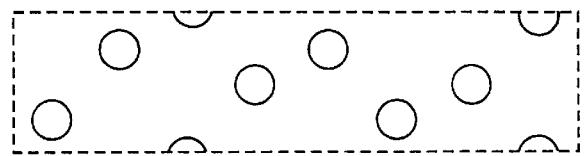
FIG. 6 depicts the pattern of a matrix used to practice the present invention.

Alternatively, the stored matrix can be a submatrix of D' that yields the same cluster pattern even though it tiles the display in the conventional manner. For example, if the underlying conventional dither matrix of FIG. 3 is an M×N matrix that, as is typical, spans two cluster rows, one can store a matrix of M×4N having the pattern that FIG. 6 suggests in order to achieve an offset of one-half of a cluster row. The resultant pattern follows the present invention's teachings, yet one can tile the display with the stored matrix in the conventional manner.

As we stated above, moreover, an offset of one-half the cluster-row spacing is not the only offset that yields the present invention's advantages. Any fraction of the row spacing, such as one-third, one-fifth, one-eighth—or even nine-eighths—yields the present invention's advantages to a greater or lesser degree. The only offsets not permitted are those that are not fractions, i.e., that are integral numbers of cluster-row spacings.

By applying the present invention's teachings, one can greatly reduce or eliminate the visual banding effect that has heretofore plagued the display of regions intended to have a more-uniform appearance. The present invention therefore constitutes a significant advance in the art.

What is claimed is:

1. In the method of rendering a source image consisting of relatively fine-resolution input pixel values by operating a scan-type display device that scans a display surface in a scan direction to display an output image consisting of relatively coarse-resolution output pixel values, which method includes the steps of (a) determining the output pixel values by comparing corresponding input pixel values to dither thresholds that occur in a pattern formed by columns of repetitions of a clustered-dot-dither matrix characterized by a cluster-row spacing and (b) operating the display device by sending it instructions that include output values thus determined, wherein the matrix-component patterns in successive columns of matrix repetitions are offset from each other, in the direction transverse to the scan direction, by a fraction of the cluster-row spacing.

2. A method as defined in claim 1 wherein the fraction of the cluster-row spacing by which successive columns of matrix repetitions are offset from each other is one-half.

3. For rendering an input image consisting of relatively fine-resolution input pixel values by operating a scan-type display mechanism that scans a display surface in a scan direction to display an output image consisting of relatively coarse-resolution output pixel values, an apparatus comprising:

A) pixel-value circuitry for determining the output pixel values by comparing corresponding input pixel values to dither thresholds that occur in a pattern formed by columns of repetitions of a clustered-dot-dither matrix characterized by a cluster-row spacing, the matrix-component patterns in successive columns of matrix repetitions being offset from each other, in the direction transverse to the scan direction, by a fraction of the cluster-row spacing; and B) output circuitry responsive to the pixel-value circuitry for operating the display mechanism by sending it instruction signals that specify output values thus determined.

4. An apparatus as defined in claim 3 wherein the fraction of the cluster-row spacing by which successive columns of matrix repetitions are offset from each other is one-half.

5. An apparatus as defined in claim 3 wherein:

A) the apparatus further includes memory circuitry that contains a larger matrix consisting of thresholds that occur in the pattern formed by the columns of repetitions of the clustered-dot-dither matrix; and B) the apparatus determines the output pixel values by comparing corresponding input pixel values to the thresholds of the larger matrix.

6. An apparatus as defined in claim 4 wherein:

A) the apparatus further includes memory circuitry that contains a larger matrix consisting of thresholds that occur in the pattern formed by columns of repetitions of the clustered-dot-dither matrix; and B) the apparatus determines the output pixel values by comparing corresponding input pixel values to the thresholds of the larger matrix.

7. An imaging apparatus comprising:

A) a scan-type display mechanism that scans a display surface in a scan direction to render an input image consisting of relatively fine-resolution input pixel values by displaying an output image consisting of relatively coarse-resolution output pixel values;

B) pixel-value circuitry for determining the output pixel values by comparing corresponding input pixel values to dither thresholds that occur in a pattern formed by columns of repetitions of a clustered-dot-dither matrix characterized by a cluster-row spacing, the matrix-component patterns in successive columns of matrix repetitions being offset from each other, in the direction transverse to the scan direction, by a fraction of the cluster-row spacing; and C) output circuitry responsive to the pixel-value circuits for operating the display mechanism by sending it instruction signals that specify output values thus determined.

8. An imaging apparatus as defined in claim 7 wherein the fraction of the cluster-row spacing by which successive columns of matrix repetitions are offset from each other is one-half.

9. An imaging apparatus as defined in claim 7 wherein:
   A) further includes memory circuitry that contains a larger matrix consisting of thresholds that occur in the pattern formed by the columns of repetitions of the clustered-dot-dither matrix; and
   B) determines the output pixel values by comparing corresponding input pixel values to the thresholds of the larger matrix.

10. An imaging apparatus as defined in claim 8 wherein the imaging apparatus:
    A) further includes memory circuitry that contains a larger matrix consisting of thresholds that occur in the pattern formed by the columns of repetitions of the clustered-dot-dither matrix; and
    B) determines the output pixel values by comparing corresponding input pixel values to the thresholds of the larger matrix.

11. A storage medium containing instructions readable by a computer to configure the computer to function as an apparatus for rendering an input image consisting of relatively fine-resolution input pixel values by operating a scan-type display mechanism that scans a display surface in a scan direction to display an output image consisting of relatively coarse-resolution output pixel values, which apparatus comprises:
    A) pixel-value circuitry for determining the output pixel values by comparing corresponding input pixel values to dither thresholds that occur in a pattern formed by columns of repetitions of a clustered-dot-dither matrix characterized by a cluster-row spacing, the matrix-component patterns in successive columns of matrix repetitions being offset from each other, in the direction transverse to the scan direction, by a fraction of the cluster-row spacing; and
    B) output circuitry responsive to the pixel-value circuitry for operating the display mechanism by sending it instruction signals that specify output values thus determined.

12. A storage medium as defined in claim 11 wherein the fraction of the cluster-row spacing by which successive columns of matrix repetitions are offset from each other is one-half.

13. A storage medium as defined in claim 11 wherein:
    A) the apparatus further includes memory circuitry that contains a larger matrix consisting of thresholds that occur in the pattern formed by the columns of repetitions of the clustered-dot-dither matrix; and
    B) the apparatus determines the output pixel values by comparing corresponding input pixel values to the thresholds of the larger matrix.

14. A storage medium as defined in claim 12 wherein:
    A) the apparatus further includes memory circuitry that contains a larger matrix consisting of thresholds that occur in the pattern formed by the columns of repetitions of the clustered-dot-dither matrix; and
    B) the apparatus determines the output pixel values by comparing corresponding input pixel values to the thresholds of the larger matrix.

* * * * *